United States Patent
Onishi (10) Patent No.: US 8,651,392 B2
(45) Date of Patent: Feb. 18, 2014

(54) THERMO-ELEMENT AND THERMOSTAT

(75) Inventor: Yukio Onishi, Ishigaki (JP)

(73) Assignee: Yukio Onishi, Ishigaki-shi, Okinawa (JP)

( * ) Notice: Subject to any disclaimer, the term of this patent is extended or adjusted under 35 U.S.C. 154(b) by 0 days.

(21) Appl. No.: 13/618,614

(22) Filed: Sep. 14, 2012

(65) Prior Publication Data

US 2013/0264393 A1   Oct. 10, 2013

(30) Foreign Application Priority Data

Apr. 5, 2012   (JP) ................................. 2012-086055

(51) Int. Cl.
*G05D 23/02*   (2006.01)

(52) U.S. Cl.
USPC ..... 236/93 A; 236/93 R; 236/99 J; 236/99 K; 236/99 R; 236/100; 236/DIG. 11

(58) Field of Classification Search
USPC ......... 236/93 A, 93 R, 99 J, 99 K, 99 R, 100, 236/DIG. 11
See application file for complete search history.

(56) References Cited

U.S. PATENT DOCUMENTS

| | | | |
|---|---|---|---|
| 3,719,085 A | | 3/1973 | Sliger |
| 4,630,770 A | * | 12/1986 | Sliger et al. .................. 236/34.5 |
| 5,033,865 A | | 7/1991 | Kuze |
| 5,119,061 A | * | 6/1992 | Kuze ............................ 337/393 |
| 5,381,951 A | | 1/1995 | Michel |
| 5,488,937 A | | 2/1996 | Kuze |
| 5,509,269 A | | 4/1996 | Kuze |
| 5,620,021 A | * | 4/1997 | Hugo ............................ 137/337 |
| 5,992,755 A | | 11/1999 | Kuze |
| 2006/0157575 A1 | * | 7/2006 | Lockhart ..................... 236/93 A |

FOREIGN PATENT DOCUMENTS

| | | |
|---|---|---|
| CN | 1122407 A | 5/1996 |
| CN | 1197156 A | 10/1998 |
| CN | 1271067 A | 10/2000 |
| JP | 58-016003 Y2 | 7/1980 |
| JP | 56-085766 U | 7/1981 |
| JP | 57-077772 U | 5/1982 |
| JP | 59-150936 U | 10/1984 |
| JP | 06-043591 Y2 | 6/1989 |
| JP | 07-098390 A | 4/1995 |
| JP | 10-068473 A | 3/1998 |
| JP | 11-293235 A | 10/1999 |

* cited by examiner

*Primary Examiner* — Cheryl J Tyler
*Assistant Examiner* — Jonathan Bradford
(74) *Attorney, Agent, or Firm* — Brinks, Gilson & Lione (57) ABSTRACT

A thermo-element having an excellent response and durability is provided. The thermo-element includes a casing having a bottom, a thermally expandable material filled in the casing and capable of expanding and contracting due to temperature changes, a piston movable in an axial direction thereof, a guide member for slidably holding the piston, and a liquid chamber defined between the thermally expandable material and the piston to receive therein a deformable, incompressible fluid. A bellows is fixed between an upper portion of the piston and an upper portion of the guide member to define a liquid space between an outer periphery of the upper portion of the piston and the bellows. The fluid in the liquid chamber can flow in and out of the liquid space via a through-hole and a radial hole.

6 Claims, 6 Drawing Sheets

THERMO-ELEMENT AND THERMOSTAT

RELATED APPLICATIONS

This application claims priority under 35 U.S.C. §119 to Japanese Patent Application No. 2012-086055 filed on Apr. 5, 2012, the entire content of which is hereby incorporated by reference.

TECHNICAL FIELD

The present invention relates to a thermo-element which is a thermo-actuator utilizing expansion and contraction of paraffin due to temperature changes, and a thermostat using the thermo-element.

BACKGROUND ART

Figure 1:
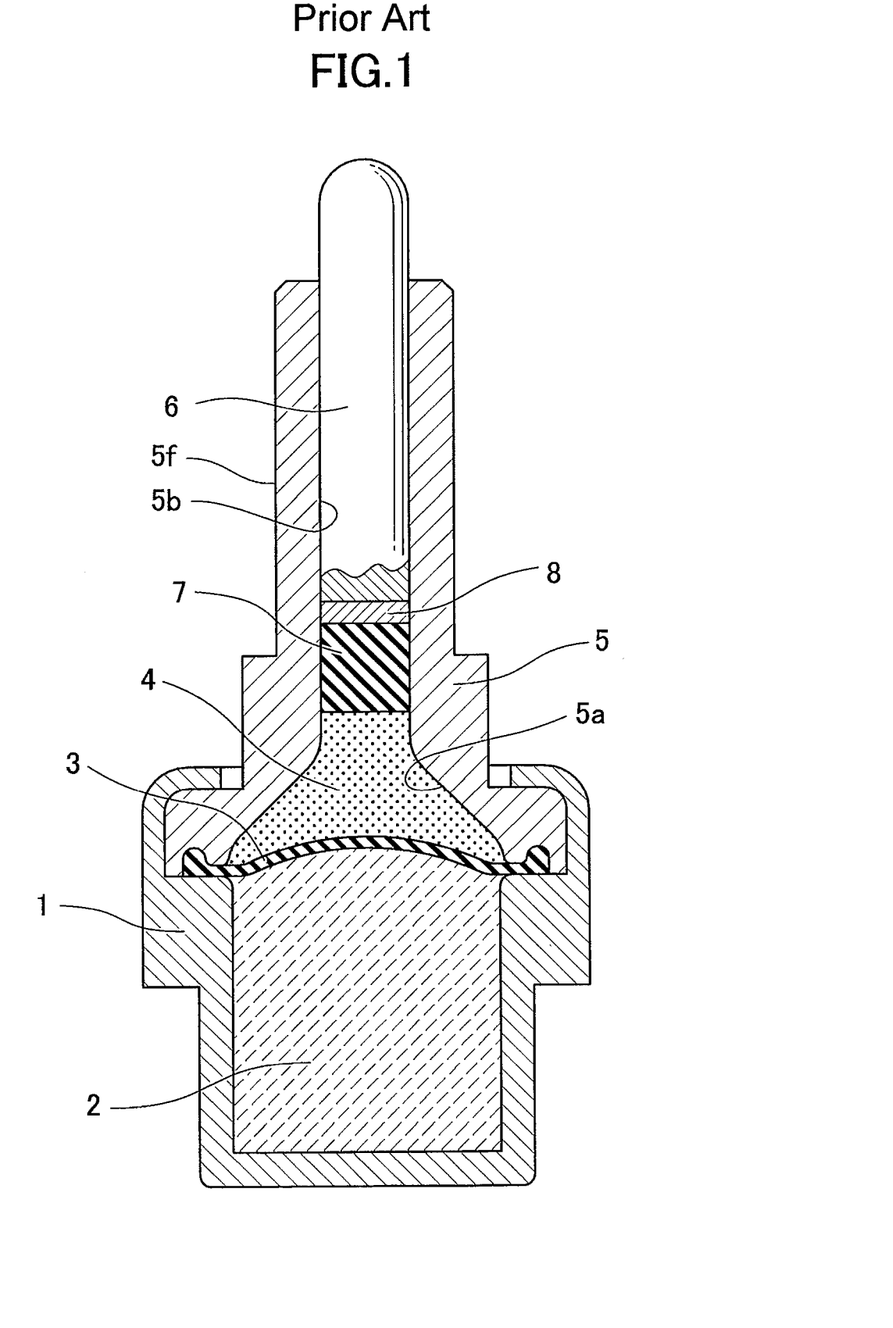
FIG. 1 is a vertical sectional view of a conventional diaphragm type thermo-element.

Heretofore, a thermo-element using a thermally expandable material, such as paraffin, as a temperature sensor, has been employed in various devices. The thermo-element is operable to convert a change in volume of paraffin due to a thermally-caused phase change thereof to a linear movement of a piston in an axial direction thereof. The thermo-element includes a diaphragm type as illustrated in FIG. 1, and other types, such as a sleeve type and a thick sealing member type (not illustrated). The diaphragm type thermo-element is configured such that a thermally expandable material (paraffin) is hermetically sealed by an elastic sealing member, and a piston is pushed out by the elastic sealing member through an incompressible fluid. Each of the sleeve type and the thick sealing member type thermo-elements is configured such that a thermally expandable material (paraffin) is hermetically sealed by an elastic sealing member, and a piston is pushed out directly by the elastic sealing member.

In a diaphragm type thermo-element illustrated in FIG. 1, a cylindrical-shaped guide member 5 is fixed to a bottomed cylindrical-shaped casing 1. A thermally expandable material 2 is filled in the casing 1, and an upper end surface of the thermally expandable material 2 is sealed up by a diaphragm 3 serving as an elastic sealing member. A liquid chamber 4 is provided between a contact surface 5a which is an inner surface of a base end portion of the guide member 5, and an upper surface of the diaphragm 3, and filled with a gum-like fluid composed of a deformable, incompressible fluid. A rubber piston 7, a protection plate 8 and a piston 6 are provided inside a sliding hole 5b of the guide member 5 and above the liquid chamber 4 in this order. An upper portion of the piston 6 protrudes upwardly from the sliding hole 5b.

Upon an increase in ambient temperature, the thermally expandable material 2 expands, so that the diaphragm 3 is raised upwardly to push up the gum-like fluid enclosed in the liquid chamber 4 above the diaphragm 3. Then, the gum-like fluid is deformed to flow into the sliding hole 5b and push the piston 6 upwardly through the rubber piston 7 and the protection plate 8. Subsequently, upon a decrease in ambient temperature, the thermally expandable material 2 contracts, so that the piston 6 is pushed down by a load (not illustrated) applied thereto. In this way, the piston 6 is relatively moved with respect to the guide member 5 in an up and down direction, in response to temperature changes.

However, the diaphragm type thermo-element has a problem that the incompressible fluid is liable to leak, due to its structural complexity. Even in the sleeve type thermo-element, the same problem occurs when it has a structure employing an incompressible fluid.

In the case of sealing a device which employs a commonly-used fluid, an O-ring or V-ring is used, and grease is applied to a sliding surface in contact with the O-ring or the like to reduce sliding resistance. The device is operated while supplying supplementary grease, because grease leakage inevitably occurs. However, a commonly-used O-ring or the like cannot be used in the thermo-element, because, if grease leakage occurs, a volume of the incompressible fluid is changed, which exerts an influence on an amount of movement of the piston.

For this reason, in the diaphragm type thermo-element, the thermally expandable material is isolated by a diaphragm, and a gum-like fluid free of liquefaction and less likely to leak is used as the incompressible fluid. Further, a rubber piston having excellent sealing performance is used as a sealing member, instead of an O-ring.

The gum-like fluid is intended to transfer expansion of the thermally expandable material to the piston, by using a material less likely to leak, so that it has poor fluidity as compared to liquid. Thus, a shape of the liquid chamber 4 for enclosing the gum-like fluid therein is restricted to a simple shape.

As a countermeasure against leakage of the gum-like fluid, studies have heretofore been made, for example, of view such as a structure of the thermo-element and a material for the gum-like fluid.

JP3225386 relates to an improvement in structure of the diaphragm type thermo-element, and discloses a structure in which a piston is inserted in a gum-like fluid composed of an incompressible fluid, and a gap between a guide member and the piston is hermetically sealed by a packing, thereby allowing for elimination of a rubber piston and a protection plate.

JP U58-016003 (Japanese Utility Model Publication) relates to an improvement of the sleeve type thermo-element, and discloses a structure in which a sealed chamber is defined between a sleeve and a piston, and filled with an incompressible fluid, wherein the sleeve is adapted to push up the piston through the incompressible fluid.

In JP3225386 and JP U58-016003, there still remains a problem of leakage of the gum-like fluid composed of an incompressible fluid, and each of the thermo-elements becomes structurally more complex.

JP U06-043591 (Japanese Utility Model Publication) relates to an improvement in the material of a gum-like fluid composed of an incompressible fluid, and discloses a gum-like fluid formed as a semifluid by finely crushing synthetic gum, mixing the resulting crushed gum pieces with a lubricant such as grease or oil, and kneading them. However, this semifluid is likely to give rise to a phenomenon lading to a locked state, such as blocking caused by the crushed gum pieces.

JP 11-293235 discloses that paraffin as the thermally expandable material is absorbed in carbon black particles and prepared in a powder form to reduce the risk of leakage of the paraffin, and that a piston is directly inserted in the thermally expandable material and adapted to be pushed up directly by the thermally expandable material due to a change in volume of the thermally expandable material. In the JP 11-293235, the paraffin absorbed in the carbon black particles is prepared in a powder form. Thus, an operation of the thermo-element is liable to become unstable, although the paraffin is sealed by a sealing member.

As stated above, in a thermo-element adapted to move a piston through an incompressible fluid according to expansion and contraction of a thermally expandable material, irrespective of whether it is a diaphragm type or the sleeve type, the problem of how to prevent leakage of the incompressible fluid (gum-like fluid) has not yet been sufficiently solved.

Therefore, there is a need for a thermo-element capable of stably operating without occurring of the problem of leakage of an incompressible fluid and with small sliding resistance of a piston.

There is another need for a thermo-element having excellent durability.

There is yet another need for a thermo-element having fewer restrictions on shape.

SUMMARY OF THE INVENTION

It is an object of the present invention to provide a thermo-element capable of stably operating without occurring of the problem of leakage of an incompressible fluid and with small sliding resistance of a piston.

It is another object of the present invention to provide a thermo-element having excellent durability.

It is yet another object of the present invention to provide a thermo-element having fewer restrictions on shape.

It is still another object of the present invention to provide a thermostat using such a thermo-element.

In the present invention, a liquid space hermetically sealed by a bellows is defined around an outer periphery of an upper portion of a piston, and a fluid in a liquid chamber for pushing up the piston according to expansion of a thermally expandable material can flow into and out of the liquid space via a through-hole inside the piston.

In accordance with one aspect of the present invention, there is provided a thermo-element which comprises: a casing having a bottom; a thermally expandable material filled in the casing and including paraffin capable of expanding and contracting due to temperature changes; an elastic sealing member sealingly enclosing the thermally expandable material in the casing; a piston movable in an axial direction thereof; a guide member fixed to an upper portion of the casing and formed with a sliding hole for slidably holding the piston; a liquid chamber defined internally by the elastic sealing member, the guide member and the piston; and a deformable, incompressible fluid received in the liquid chamber, wherein the piston is adapted to be moved along the sliding hole of the guide member in the axial direction, according to expansion and contraction of the thermally expandable material and through the incompressible fluid in the liquid chamber. The thermo-element is characterized in that it comprises a bellows surrounding an outer periphery of the piston, wherein an upper end of the bellows is sealingly fixed to an upper region of the outer periphery of the piston, and a lower end of the bellows is sealingly fixed to an upper portion of the guide member, so that a hermetic liquid space is defined between an outer surface of the piston and an inner surface of the bellows, and wherein the piston is internally formed with a through-hole extending inside the piston in the axial direction and communicating with the liquid chamber, and a radial hole extending radially from the through-hole and having an opening exposed to the liquid space outside the piston, so that the incompressible fluid in the liquid chamber can flow in and out of the liquid space according to expansion and contraction of the thermally expandable material.

When the thermally expandable material expands in response to an increase in ambient temperature, the incompressible fluid in the liquid chamber pushes up a lower end portion of the piston and flows into the liquid space via the through-hole inside the piston to push up the piston. Thus, an area for pushing the piston becomes larger, so that it becomes possible to push up the piston by a stronger force. When the thermally expandable material contracts, the incompressible fluid is returned from the liquid space to the liquid chamber via the through-hole inside the piston, and the piston is returned downwardly. Therefore, an operation of the thermo-element becomes stable.

A fluid having excellent fluidity may be used as the fluid in the liquid chamber, and the liquid space may be filled with the same incompressible fluid. In this case, it becomes possible to ease restrictions on a shape of the liquid chamber, thereby allowing for use of a large-diameter casing. Even if the fluid in the liquid chamber leaks from a gap between the piston and the guide member, it flows into the liquid space, so that it becomes possible to eliminate the need for sealing using an O-ring. Therefore, the piston can be slidingly moved smoothly.

Preferably, the thermo-element of the present invention further comprises a protection plate disposed between a lower end portion of the piston and an upper surface of a central portion of the elastic sealing member to protect the elastic sealing member.

The protection plate can prevent the elastic sealing member from being abnormally bent by the lower end portion of the piston.

Preferably, in the thermo-element of the present invention, the piston has a large-diameter segment in an upper portion thereof, wherein the large-diameter segment is adapted to be brought into contact with an upper end of the guide member to restrict a downward movement of the piston to a position where the large-diameter segment is brought into contact with the upper end of the guide member.

This makes it possible to set the limit of the downward movement of the piston to prevent the elastic sealing member from being damaged by the lower end portion of the piston.

In accordance with another aspect of the present invention, there is provided a thermostat which comprises: a thermo-element which has a casing having a bottom, a thermally expandable material filled in the casing and including paraffin capable of expanding and contracting due to temperature changes, an elastic sealing member sealingly enclosing the thermally expandable material in the casing, a piston movable in an axial direction thereof, a guide member fixed to an upper portion of the casing, a liquid chamber defined internally by the elastic sealing member, the guide member and the piston, and a deformable, incompressible fluid received in the liquid chamber, wherein the guide member has a guide tube portion formed with a sliding hole for slidably holding the piston, a large-diameter portion formed below the guide tube portion to have an outer diameter greater than that of the guide tube portion, and a valve element for a thermostat control valve, formed by an outer periphery of the large-diameter portion;

a lower frame for receiving therein the thermo-element, the lower frame being formed with a flow passage for allowing liquid to pass therethrough;

an upper frame fixed to the lower frame and formed with a flow passage for allowing the liquid to pass therethrough, the upper frame having an upper portion in contact with an upper portion of the piston, and a valve seat adapted to come into contact with the valve element of the thermo-element; and a spring for pressing the valve element of the thermo-element against the valve seat of the upper frame, wherein the piston is adapted to be relatively moved with respect to the guide member in the axial direction along the sliding hole, according to expansion and contraction of the thermally expandable material and through the incompressible fluid in the liquid chamber, so that a distal end of the upper portion of the piston pushes up the upper portion of the upper frame in relative relation with respect to the guide member, thereby opening the valve element.

The thermostat is characterized in that the thermo-element comprises a bellows surrounding an outer periphery of the piston, wherein an upper end of the bellows is sealingly fixed to an upper region of the outer periphery of the piston, and a lower end of the bellows is sealingly fixed to an upper portion of the guide member, so that a hermetic liquid space is defined between an outer surface of the piston and an inner surface of the bellows.

Preferably, the thermostat of the present invention further comprises a nut threadingly engaged with the upper portion of the piston, wherein the nut is adapted to be positionally adjustable so as to adjust its heightwise position when the piston starts to push up the upper frame in relative relation with respect to the guide member.

This makes it possible to adjust a temperature at which the thermostat control valve starts opening.

Preferably, in the thermostat of the present invention, the large-diameter portion of the guide member has an outer edge region which is bent downwardly and then further bent inwardly so as to hermetically seal between the casing and the elastic sealing member through a washer.

This makes it possible to reliably prevent the incompressible fluid in the liquid chamber from leaking.

The present invention can provide a thermo-element capable of stably operating without the problem of leakage of an incompressible fluid and with small sliding resistance of a piston.

Further, the present invention can provide a thermo-element having excellent durability.

Further, the present invention can provide a thermo-element having fewer restrictions on shape.

Further, the present invention can provide a thermostat using such a thermo-element.

DETAILED DESCRIPTION OF THE PREFERRED EMBODIMENTS

With reference to the drawings, the present invention will now be described based on an embodiment thereof.

Figure 2:
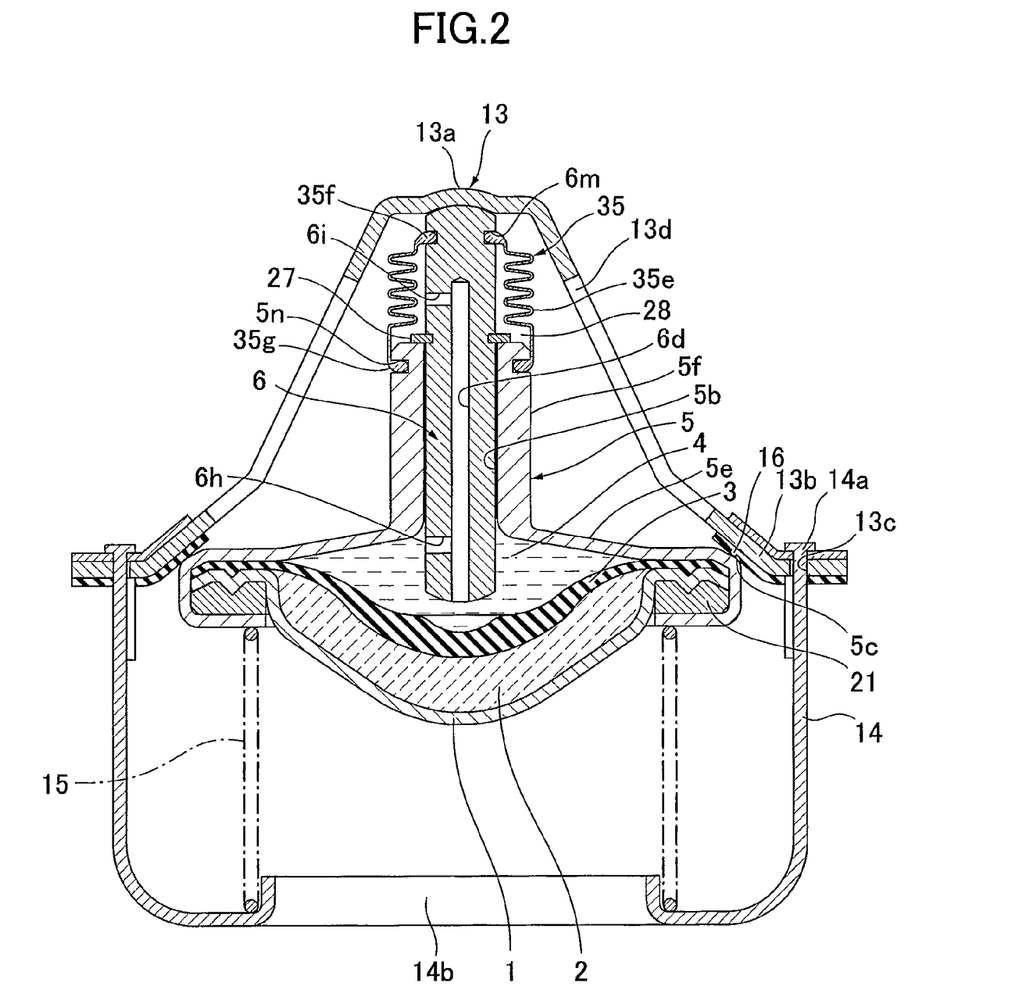
FIG. 2 is a vertical sectional view of a thermostat using a thermo-element according to a first embodiment of the present invention.
Figure 3:
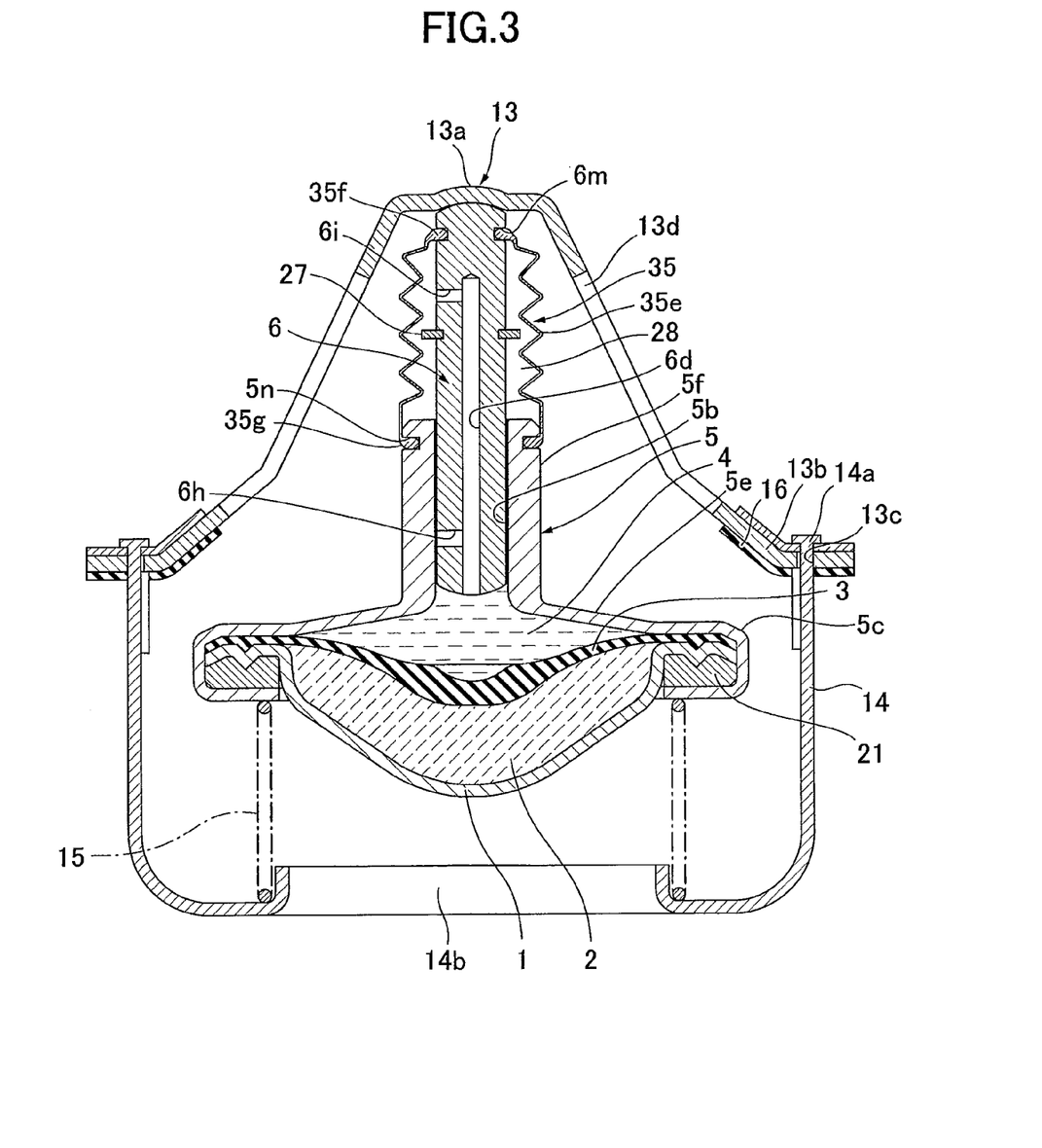
FIG. 3 is a vertical sectional view of the thermostat illustrated in FIG. 2, under high ambient temperatures.
Figure 4:
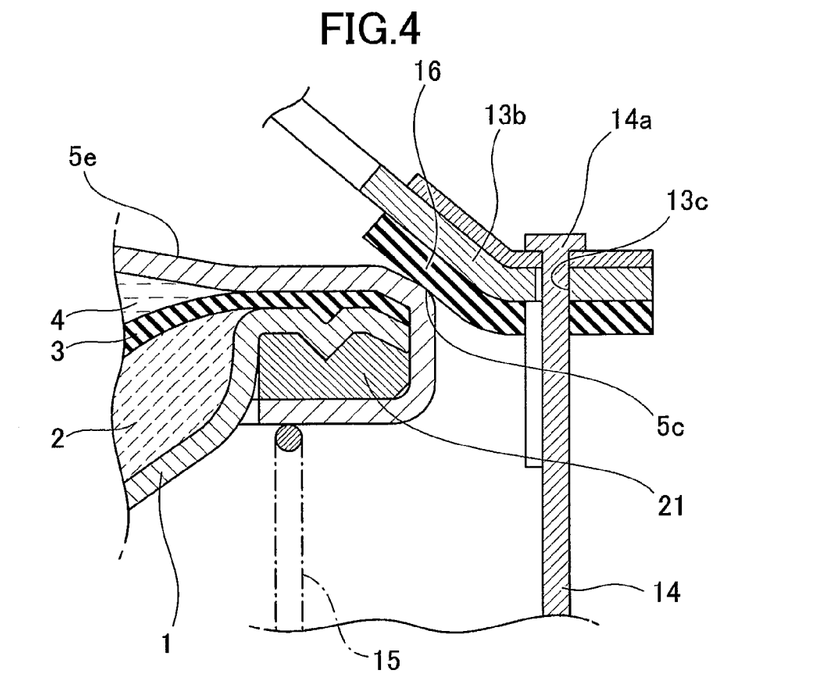
FIG. 4 is an enlarged sectional view of an edge portion of a diaphragm in the thermo-element illustrated in FIG. 2.

FIGS. 2 to 4 are vertical sectional views of a thermostat using a thermo-element according to a first embodiment of the present invention. The thermo-element according to the first embodiment comprises a bellows 35 around an upper portion of a piston 6, wherein the thermo-element is configured such that a fluid in a liquid chamber 4 can flow into and out of a liquid space 28 hermetically sealed by the bellows 35. FIG. 2 illustrates a closed state of a thermostat control valve, wherein a valve element 5c for the thermostat control valve is pressed against a valve seat 16 by a spring 15. In this state, the piston 6 is moved downwardly relative to a guide member 5, and the bellows 35 is shrunk. FIG. 3 illustrates an opened state of the thermostat control valve, wherein a thermally expandable material 2 expands in response to an increase in ambient temperature, and thereby fluid in the liquid chamber 4 pushes up the piston 6 and flows into the liquid space 28 to stretch the bellows 35, to open the valve element 5c. During operation of the thermostat, a gap between the valve element 5c and the valve seat 16 is changed between the state in FIG. 2 and that in FIG. 3, so that a flow rate of fluid, such as coolant, flowing from a flow passage 14b to a flow passage 13d, is controlled.

When a thermostat having a thermo-element is used, usually a frame is fixed, the position of the piston 6 is fixed, and the guide member 5 is moved relative to the piston 6. In this specification, it is explained that the piston 6 is moved relative to the guide member 5 so as to be consistent with the explanation of the thermo-element.

The thermo-element according to the first embodiment will first be described in detail. The thermo-element comprises a casing 1, a thermally expandable material 2, such as wax, filled in the casing 1, a diaphragm 3 (elastic sealing member) sealingly enclosing the thermally expandable material 2 in the casing 1, a guide member 5 integral with a valve element 5c for a thermostat control valve, and a piston 6 disposed inside the guide member 5. A liquid chamber 4 is defined by a lower surface of a large-diameter portion of the guide member, a lower surface of the piston 6, and an upper surface of the diaphragm 3. The thermo-element further comprises a washer 21 for hermetically sealing between the diaphragm 3 and the casing 1.

A stopper ring 27 having an outer diameter greater than that of the piston 6 is fixed to an outer periphery of an upper portion of the piston 6. When the piston 6 is moved downwardly, the stopper ring 27 is brought into contact with an upper end of the guide member 5, thereby restricting the downward movement of the piston 6 relative to the guide member 5.

A structure of the bellows 35 in an upper portion of the thermo-element will be described later.

The liquid chamber 4 of the thermo-element is filled with an incompressible fluid such as oil, and the piston 6 is moved by this incompressible fluid. As it is only necessary to have moderate sealing performance, the rubber piston 7 and the protection plate 8 used in the conventional diaphragm type thermo-element are not used. The casing 1 of the thermo-element has an outer diameter approximately equal to an outer diameter of the valve element 5c, and a relatively thin thickness. The casing 1 has a concave-shaped central portion in which the thermally expandable material 2 is received. An outer peripheral portion of the casing 1 on an outward side of the central portion has a generally planar ring shape, and a downwardly extending protrusion is circularly formed on a central portion in the width direction of the ring-shaped outer peripheral portion. An upper side of the thermally expandable material 2 is sealingly closed by the diaphragm 3. The diaphragm 3 has an outer diameter approximately equal to the outer diameter of the valve element 5c.

The guide member 5 has a guide tube portion 5f provided on an upper side thereof and formed with a sliding hole 5b for slidably receiving therein the piston 6. The large-diameter portion 5e formed below the guide tube portion 5f has a diameter greater than that of the guide tube portion 5f. An outer periphery of the large-diameter portion 5e is formed as the valve element 5c for the thermostat control valve. In other words, the guide member 5 and the valve element 5c for the thermostat control valve are integrated together. The washer 21 is formed in a ring shape and in contact with a lower surface of the outer peripheral portion of the casing 1. A circular depression for receiving therein the protrusion of the casing 1 is formed in a radially central region of the ring-shaped washer 21.

An outer peripheral edge portion of the valve element 5c of the guide member 5 is bent downwardly and then bent inwardly so as to be wrapped around an outer peripheral edge portion of the diaphragm 3, an outer peripheral edge portion of the casing 1 and the washer 21, and fastened thereto to prevent the thermally expandable material 2 and the fluid in the liquid chamber 4 from leaking.

FIG. 4 is an enlarged sectional view of a sealing region of the diaphragm 3. Each of the outer peripheral edge portion of the diaphragm 3 and the outer peripheral edge portion of the casing 1 extends to an inside portion of the outer peripheral edge portion of the valve element 5c of the guide member 5.

Figure 5:
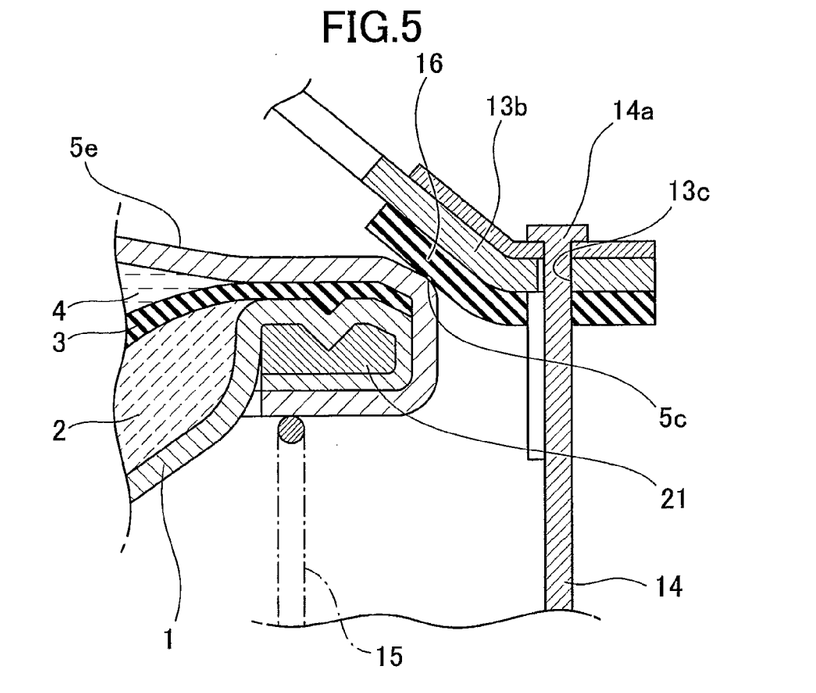
FIG. 5 is an enlarged sectional view of an edge portion of a diaphragm in the thermo-element illustrated in FIG. 2, wherein the edge portion of the diaphragm is extended to a lower surface of a washer.

In a modification illustrated in FIG. 5, the outer peripheral edge portion of the casing 1 is further extended to a lower side of the washer 21. This makes it possible to further enhance sealing performance.

The thermo-element comprises the above components.

In addition to the components of the above thermo-element, the thermostat using this thermo-element comprises a generally cylindrical-shaped lower frame 14, an upper frame 13 covering an upper region of the lower frame 14, a spring 15 for pressing the thermo-element against the upper frame 13, and a valve seat 16 adapted to come into contact with the valve element 5c. The lower frame 14 has a flow passage 14b formed as a large circular opening having a center on an central axis of the thermo-element or thermostat, and a plurality of fitting claws 14a formed on an outer periphery thereof and adapted to be fittingly engaged with the upper frame 13.

The upper frame 13 on top of the lower frame 14 has a central portion formed as a support point 13a in contact with the piston 6. The upper frame 13 has a plurality of fitting holes 13c formed in an outer periphery thereof and adapted to be fittingly engaged with the fitting claws 14a of the lower frame 14. The upper frame 13 and the lower frame 14 are integrally coupled together by fittingly engaging the fitting claws 14a with respective ones of the fitting holes 13c. Further, the upper frame 13 has a valve seat portion 13b formed along the outer periphery thereof and adapted to come into contact with the valve element 5c, and a flow passage 13d formed between the support point 13a and the valve seat portion 13b, as a large opening oriented obliquely upwardly. The valve seat 16 is composed of an elastic body and adhered to the valve seat portion 13b. A combination of the valve seat 16 and the valve element 5c formed by the outer periphery of the large-diameter portion 5e of the guide member 5 makes up the thermostat control valve.

Respective structures of the piston 6 and the bellows 35 in the upper portion of the thermo-element according to the first embodiment will be described in more detail.

The piston 6 has a groove 6m circumferentially formed in an outer periphery thereof at a position close to a distal end thereof, and the guide member 5 has a groove 5n circumferentially formed in an outer periphery thereof at a position close to a distal end thereof. An upper end portion 35f of the bellows 35 is sealingly fitted in the groove 6m of the piston 6, and a lower end portion 35g of the bellows 35 is sealingly fitted in the groove 5n of the guide member 5, so that the bellows 35 covers an outer periphery of the upper portion of the piston 6.

The bellows 35 has an accordion-pleated portion 35e between the upper end portion 35f and the lower end portion 35g. The accordion-pleated portion 35e has a plurality of peaks each having a relatively large diameter, a plurality of valleys each having a relatively small diameter, and a plurality of slopes each extending between adjacent ones of the peaks and valleys. Each of the slope areas may be a flat surface, or may be a gently curved surface connecting the adjacent peak and valley.

The bellows 35 is formed using a thin metal material. Alternatively, the bellows 35 may be formed using any other suitable material. A shape of the bellows 35 in cross-section taken along a plane perpendicular to an axial direction of the piston 6 may be any suitable shape, such as a circular shape or a square shape.

The hermetic liquid space 28 is defined between an outer surface of the piston 6 and an inner surface of the bellows 35 and between the upper end portion 35f of the bellows 35 and the upper end of the guide member 5. The piston 6 is internally formed with a through-hole 6d. The through-hole 6d of the piston 6 is formed such that it does not penetrate through the piston 6 up to an upper end face thereof, and a radial hole 6i is provided which extends radially from the through-hole 6d and communicates with the outer periphery of the piston 6. The number of the radial holes 6i may be two or more. The radial hole 6i is formed below the groove 6m of the piston 6 to have an opening exposed to the liquid space 28.

The through-hole 6d inside the piston 6 may be fabricated by forming a through-hole penetrating through the piston 6 from the upper end face to a lower end face thereof, and then plugging a part of the formed through-hole from the radial hole 6i to the upper end face.

A lower portion of the piston 6 is formed with a radial hole 6h extending radially from the through-hole 6d and having an opening exposed to the liquid chamber 4, so that the fluid in the liquid chamber 4 can flow into and out of the through-hole 6d not only through a lower end of the through-hole 6d but also through the radial hole 6h.

A fluid (e.g., oil) is filled in the liquid chamber 4, and the liquid space 28 will be filled with the same fluid as that filled in the liquid chamber 4.

The liquid space 28 communicates with the through-hole 6d via the radial hole 6i of the piston 6, and then communicates with the liquid chamber 4 via the through-hole 6d. The liquid space 28 has a cross-sectional area greater than that of the piston 6, in a cross-section taken along a plane perpendicular to the central axis. Thus, when the liquid space 28 is filled with the fluid, a force for pushing up the piston becomes larger, which stabilizes a movement of the piston 6.

A fluid having excellent fluidity, such as oil, is used as the fluid in the liquid chamber 4. The oil is a low-viscosity oil having lubricating properties, such as engine oil or silicone oil. Thus, the fluid in the liquid chamber 4 can flow into the liquid space 28 via the through-hole 6d and the radial hole 6i of the piston 6, and then can flow back to the liquid chamber 4.

In FIG. 2, the stopper ring 27 is in contact with the upper end of the guide member 5. Upon an increase in ambient temperature, the thermally expandable material 2 expands, so that the diaphragm 3 is moved upwardly to push up a lower end portion of the piston 6 through the fluid in the liquid chamber 4, as illustrated in FIG. 3. Concurrently, the fluid in the liquid chamber 4 flows into the liquid space 28 via the through-hole 6d and the radial hole 6i, to push up the upper end portion 35f of the bellows 35 and push down the upper end of the guide member 5, so that a vertical length of the liquid space 28 is increased. Thus, the stopper ring 27 is moved away from the upper end of the guide member 5, and the piston 6 is moved upwardly relative to the guide member 5 (the guide member 5 is moved downwardly). Therefore, the valve element 5c for the thermostat control valve is opened.

Through the above process, the bellows 35 is vertically stretched and placed in the state illustrated in FIG. 3. When the bellows 35 is stretched, a distance between opposed points of each peak of the bellows 35 with respect to the central axis of the piston 6 is reduced, whereas a distance between opposed points of each valley of the bellows 35 with respect to the central axis of the piston 6 is increased. On the other hand, a distance between opposite points of an intermediate region between each adjacent peak and valley of the bellows 35 with respect to the central axis of the piston 6 is not changed. Thus, the liquid space 28 is vertically expanded, and a volume of the liquid space 28 is increased. The bellows 35 is made of a metal material, so that it has almost no expansion/contraction in a direction perpendicular to the central axis of the piston 6.

Subsequently, upon a decrease in ambient temperature, the thermostat is returned to the state illustrated in FIG. 2. Specifically, the thermally expandable material 2 contracts, so that the diaphragm 3 is moved downwardly, so that the fluid filled in the liquid space 28 is returned to the liquid chamber 4 via the radial hole 6i and the through-hole 6d of the piston 6. Thus, the bellows 35 is shrunk, and the vertical length of the liquid space 28 is reduced. Therefore, the piston 6 moved upwardly with respect to the guide member 5 is returned downwardly (the guide member 5 is returned upwardly). The stopper ring 27 is brought into contact with the upper end of the guide member 5. The valve element 5c for the thermostat control valve is pushed back by the spring 15, and closed.

Although the bellows 35 is made of a metal material, the bellows 35 can expand and contract in response to a movement of the fluid in the liquid chamber 4, because the expansion and contraction of the thermally expandable material 2 gently occur, and the movement of the piston is relatively slow.

In the first embodiment, if the fluid in the liquid chamber 4 leaks from a gap between the outer surface of the piston 6 and an inner surface of the sliding hole 5b of the guide member 5, it flows into the liquid space 28. This leakage causes no problem, because a fluid to be filled in the liquid space 28 is the same as the fluid in the liquid chamber 4. This makes it possible to eliminate the need for an O-ring which would otherwise be required for sealing between the outer surface of the piston 6 and the inner surface of the sliding hole 5b of the guide member 5.

Even if the above leakage of the fluid occurs, there is no risk of contaminating an external liquid. In addition, the liquid chamber is never contaminated by an external liquid. Furthermore, the fluid is filled between the sliding hole 5b and the outer surface of the piston 6, so that it becomes possible to prevent a problem of locking of the piston 6.

In the first embodiment, the fluid, such as oil, filled in the liquid chamber 4 has fluidity better than that of a gum-like fluid. Thus, the fluid in the liquid chamber 4 can flow into the liquid space 28 via the through-hole 6d and the radial hole 6i of the piston 6, to push up the piston 6 by a strong pressure.

Even if a diameter of the liquid chamber 4 is increased, the pressing force of the fluid can be sufficiently transferred to the piston 6 at a center of the liquid chamber 4, so that it becomes possible to use a casing 1 having a large diameter almost equal to an outer diameter of the valve element 5c. Thus, even if the thermally expandable material 2 has a relatively short axial length, and a movement of the diaphragm 3 is relatively small in an up and down direction, the piston can be relatively moved in the up and down direction with respect to the guide member 5 by a sufficient distance.

As stated above, instead of a gum-like fluid, fluid with excellent fluidity is used, so that it becomes possible to ease restrictions on a shape of the liquid chamber 4, thereby allowing the thermostat to be increased in size and reduced in thickness.

Figure 6:
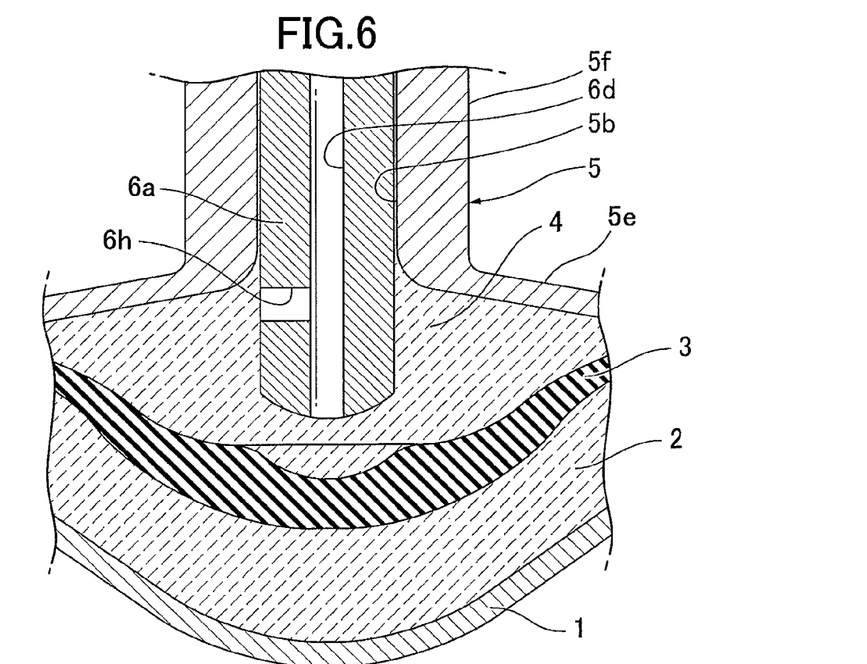
FIG. 6 is an enlarged sectional view of a lower portion of the piston and a part of the diaphragm in the thermo-element illustrated in FIG. 2.

FIG. 6 is an enlarged sectional view of a lower portion of the piston 6 and a central portion of the diaphragm 3. The diaphragm 3 is formed such that a thickness thereof gradually increases in a direction from an outer periphery to a center thereof to prevent abnormal deformation thereof due to a lower end portion of the piston 6. The central portion of the diaphragm 3 is formed with a depression for receiving therein the lower end portion of the piston 6. No member is interposed between the lower end portion of the piston 6 and the central portion of the diaphragm 3. Thus, if the piston 6 is moved downwardly, the lower end portion of the piston 6 is brought into direct contact with the central portion of the diaphragm 3.

Figure 7:
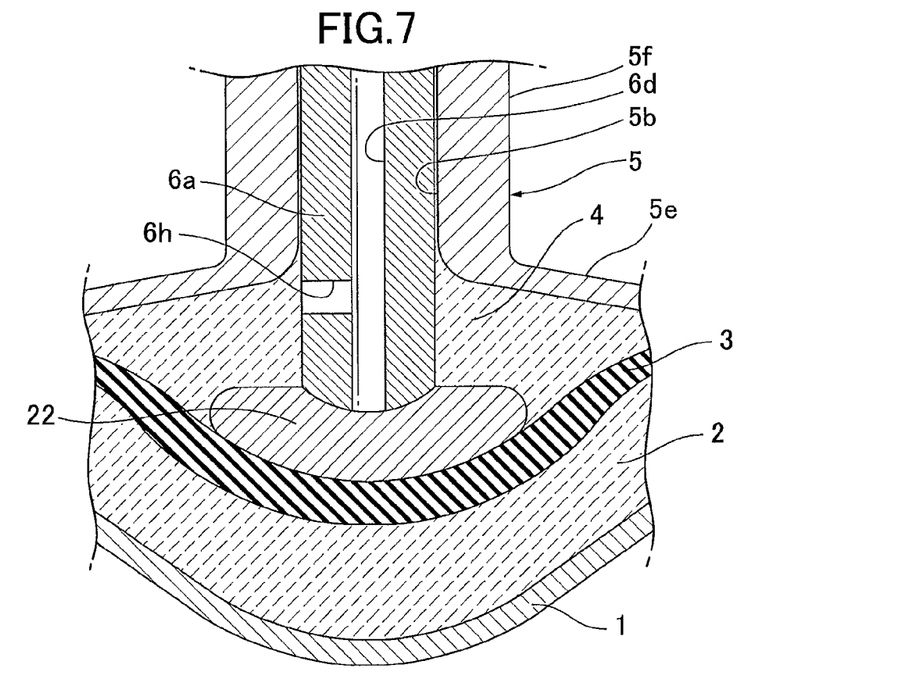
FIG. 7 is an enlarged sectional view of a lower portion of a piston and a part of a diaphragm in a thermo-element according to a second embodiment of the present invention, wherein a diaphragm protection plate is provided.

FIG. 7 is an enlarged sectional view of a lower portion of a piston 6 and a central portion of a diaphragm 3 in a thermo-element according to a second embodiment of the present invention. In the second embodiment, a protection plate 22 is used to prevent the diaphragm 3 from being deformed by the lower portion of the piston 6. The remaining structure is the same as that of the thermo-element according to the first embodiment, except for the following points.

In the second embodiment, a thickness of the diaphragm 3 is approximately constant, and the depression in the first embodiment for receiving therein the lower end portion of the piston 6 is not formed. The protection plate 22 for protecting the diaphragm 3 is interposed between the lower end portion of the piston 6 and the central portion of the diaphragm 3. The protection plate 22 is made of a material less likely to undergo deformation, and formed in a generally circular disk shape, wherein a depression for receiving therein the lower end portion of the piston 6 is formed in a central region of an upper surface thereof, and a lower surface thereof has a shape conforming to that of an upper surface of the diaphragm 3.

If the lower end portion of the piston 6 is brought into direct contact with the diaphragm 3 as illustrated in FIG. 6, an excessive force is applied to the diaphragm 3, which is likely to cause abnormal deformation. When the protection plate 22 is used as in the second embodiment illustrated in FIG. 7, the diaphragm 3 is not subject to the abnormal deformation. Even if the lower end of the through-hole 6d is closed by the protection plate 22, the fluid in the liquid chamber 4 can flow in and out of the through-hole 6d via the radial hole 6h.

It is to be understood that the protection plate 22 is optional and omittable. Further, the protection plate 22 may also be provided in an aftermentioned third embodiment.

Figure 8:
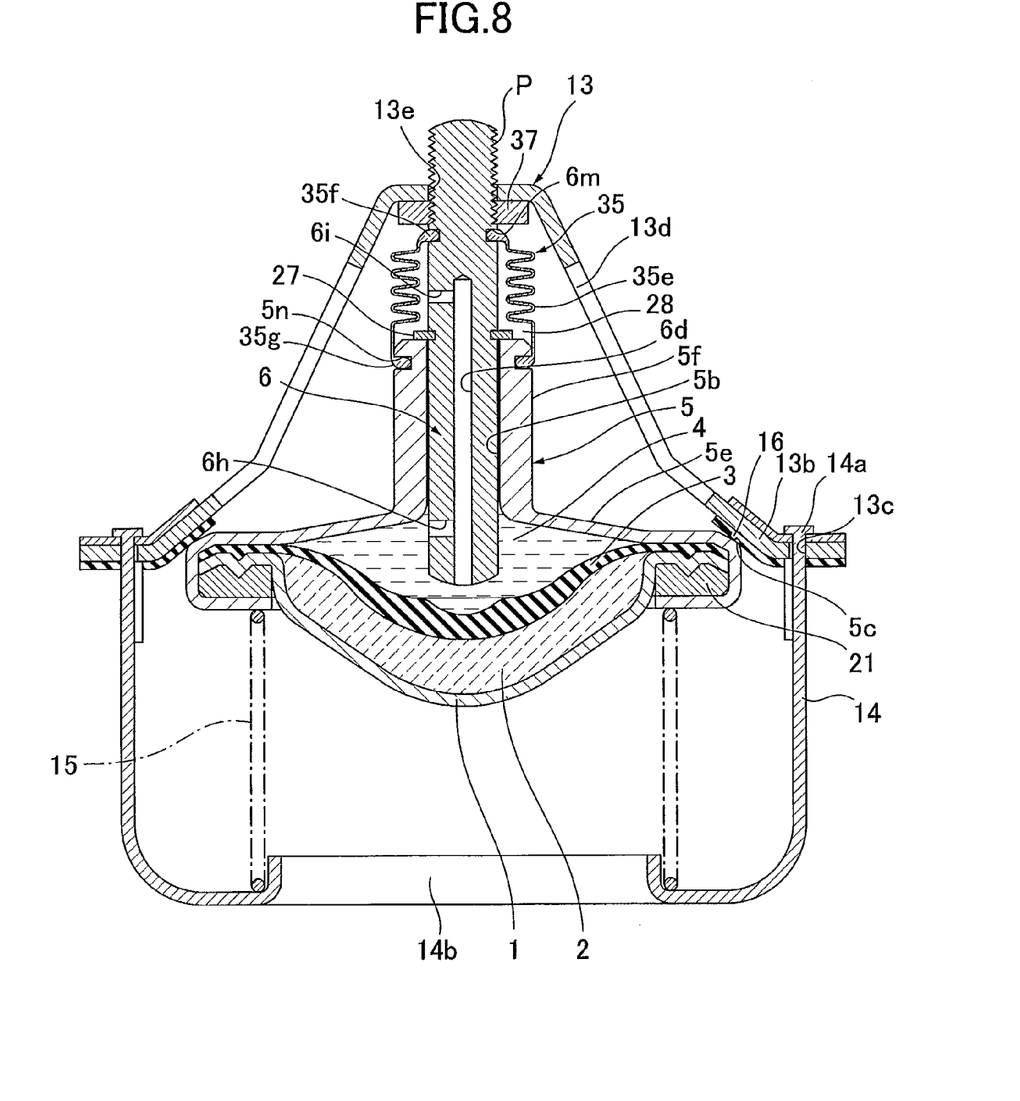
FIG. 8 is a vertical sectional view of a thermostat using a thermo-element according to a third embodiment of the present invention.

FIG. 8 is a vertical sectional view of a thermo-element according to a third embodiment of the present invention. In the third embodiment, a nut 37 is provided on an upper portion of a piston 6. The nut 37 is adapted to be positionally adjusted so as to adjust its height position when the piston 6 starts to push up an upper frame 13 in relative relation with respect to a guide member 5. This makes it possible to adjust a temperature at which the thermostat control valve starts opening (i.e., a valve opening temperature).

In the third embodiment, instead of the support point 13*a*, a top portion of the upper frame 13 is formed with a hole 13*e* for allowing the piston 6 to pass therethrough. The piston 6 has a relatively long length so that it protrudes upwardly from the hole 13*e* of the top portion of the upper frame 13. The piston 6 has a thread 6*p* formed in an outer periphery of the upper portion of the piston 6. The nut 37 having an internal thread is threadingly engaged with the thread 6*p*. The nut 37 is adapted to allow the upper frame 13 in a position surrounding the hole 13*e* of the top portion thereof to be pushed up by an upper surface of the nut 37. The valve opening temperature of the valve element 5*c* can be adjusted by adjusting a height position where the piston 6 starts to push up the upper frame 13 in relative relation with respect to the guide member 5. The remaining structure is the same as that in the first embodiment.

What is claimed is:

1. A thermo-element comprising:
   a casing having a bottom;
   a thermally expandable material filled in the casing, the thermally expandable material including paraffin capable of expanding and contracting due to temperature changes;
   an elastic sealing member sealingly enclosing the thermally expandable material in the casing;
   a piston movable in an axial direction thereof;
   a guide member fixed to an upper portion of the casing and formed with a sliding hole for slidably holding the piston;
   a liquid chamber defined internally by the elastic sealing member, the guide member and the piston; and
   a deformable, incompressible fluid received in the liquid chamber,
   wherein the piston is adapted to be moved along the sliding hole of the guide member in the axial direction, according to expansion and contraction of the thermally expandable material and through the incompressible fluid in the liquid chamber,
   the thermo-element being characterized in that it comprises a bellows surrounding an outer periphery of the piston, wherein an upper end of the bellows is sealingly fixed to an upper region of the outer periphery of the piston, and a lower end of the bellows is sealingly fixed to an upper portion of the guide member, so that a hermetic liquid space is defined between an outer surface of the piston and an inner surface of the bellows, and
   wherein the piston is internally formed with a through-hole extending inside the piston in the axial direction and communicating with the liquid chamber, and a radial hole extending radially from the through-hole and having an opening exposed to the liquid space outside the piston, so that the incompressible fluid in the liquid chamber can flow in and out of the liquid space according to expansion and contraction of the thermally expandable material.

2. The thermo-element as defined in claim 1, which further comprises a protection plate disposed between a lower end portion of the piston and an upper surface of a central portion of the elastic sealing member to protect the elastic sealing member.

3. The thermo-element as defined in claim 1, wherein the piston has a large-diameter segment in an upper portion thereof, the large-diameter segment being adapted to be brought into contact with an upper end of the guide member to restrict a downward movement of the piston relative to the guide member to a position where the large-diameter segment is brought into contact with the upper end of the guide member.

4. A thermostat comprising:
   a thermo-element which has a casing having a bottom, a thermally expandable material filled in the casing and including paraffin capable of expanding and contracting due to temperature changes, an elastic sealing member sealingly enclosing the thermally expandable material in the casing, a piston movable in an axial direction thereof, a guide member fixed to an upper portion of the casing, a liquid chamber defined internally by the elastic sealing member, the guide member and the piston, and a deformable, incompressible fluid received in the liquid chamber,
   wherein the guide member has a guide tube portion formed with a sliding hole for slidably holding the piston, a large-diameter portion formed below the guide tube portion to have an outer diameter greater than that of the guide tube portion, and a valve element for a thermostat control valve, formed by an outer periphery of the large-diameter portion;
   a lower frame for receiving therein the thermo-element, the lower frame being formed with a flow passage for allowing liquid to pass therethrough;
   an upper frame fixed to the lower frame and formed with a flow passage for allowing the liquid to pass therethrough, the upper frame having an upper portion in contact with an upper portion of the piston, and a valve seat adapted to come into contact with the valve element of the thermo-element; and
   a spring for pressing the valve element of the thermo-element against the valve seat of the upper frame,
   wherein the piston is adapted to be relatively moved with respect to the guide member in the axial direction along the sliding hole, according to expansion and contraction of the thermally expandable material and through the incompressible fluid in the liquid chamber, so that a distal end of the upper portion of the piston pushes up the upper portion of the upper frame in relative relation with respect to the guide member, thereby opening the valve element,
   the thermostat being characterized in that the thermo-element comprises a bellows surrounding an outer periphery of the piston, wherein an upper end of the bellows is sealingly fixed to an upper region of the outer periphery of the piston, and a lower end of the bellows is sealingly fixed to an upper portion of the guide member, so that a hermetic liquid space is defined between an outer surface of the piston and an inner surface of the bellows, and
   wherein the piston is internally formed with a through-hole extending inside the piston in the axial direction and communicating with the liquid chamber, and a radial hole extending radially from the through-hole and having an opening exposed to the liquid space outside the piston, so that the incompressible fluid in the liquid chamber can flow in and out of the liquid space according to expansion and contraction of the thermally expandable material.

5. The thermostat as defined in claim 4, which further comprises a nut threadingly engaged with the upper portion of the piston, wherein the nut is adapted to be positionally adjustable so as to adjust its height position where the piston starts to push up the upper frame in relative relation with respect to the guide member.

6. The thermostat as defined in claim 4, the large-diameter portion of the guide member has an outer edge region which is bent downwardly and then further bent inwardly so as to hermetically seal between the casing and the elastic sealing member through a washer.

\* \* \* \* \*